United States Patent [19]

Takada

[11] Patent Number: 5,237,164
[45] Date of Patent: Aug. 17, 1993

[54] CARD HAVING RETROREFLECTIVE BAR CODES AND A MAGNETIC STRIPE

[75] Inventor: Hirohisa Takada, Tokyo, Japan

[73] Assignee: Sony Corporation, Tokyo, Japan

[21] Appl. No.: 803,749

[22] Filed: Dec. 4, 1991

Related U.S. Application Data

[63] Continuation of Ser. No. 509,050, Apr. 13, 1990, abandoned.

[30] Foreign Application Priority Data

May 12, 1989 [JP] Japan ............................... 1-119296
May 31, 1989 [JP] Japan ............................... 1-138148

[51] Int. Cl.$^5$ ............................................ G06K 19/06
[52] U.S. Cl. ................................. 235/487; 235/382; 235/494; 359/534
[58] Field of Search ............ 235/494, 487, 488, 382, 235/382.5; 350/102, 103, 104; 359/529, 530, 534, 536, 541, 542

[56] References Cited

U.S. PATENT DOCUMENTS

| | | | |
|---|---|---|---|
| 4,002,889 | 1/1977 | Hoyer-Ellefsen | 235/487 |
| 4,011,435 | 3/1977 | Phelps et al. | 235/488 |
| 4,055,377 | 10/1977 | Erickson et al. | 350/103 |
| 4,066,873 | 1/1978 | Schatz | 235/487 |
| 4,082,426 | 4/1978 | Brown | 350/103 |
| 4,085,314 | 4/1978 | Schultz et al. | 235/488 |
| 4,099,591 | 7/1978 | Carr | 250/568 |
| 4,409,470 | 10/1983 | Shepard et al. | 235/472 |
| 4,575,625 | 3/1986 | Knowles | 235/467 |
| 4,658,147 | 4/1987 | Eldering | 250/566 |
| 4,660,929 | 4/1987 | Sick | 359/534 |
| 4,685,138 | 8/1987 | Antes et al. | 235/488 |
| 4,757,329 | 7/1988 | Sato et al. | 235/488 |
| 4,788,441 | 11/1988 | Laskowski | 280/561 |
| 4,855,584 | 8/1989 | Tomiyama et al. | 235/487 |
| 4,896,943 | 1/1990 | Tolliver et al. | 350/104 |
| 4,958,065 | 9/1990 | Weinberger | 235/488 |
| 5,001,696 | 3/1991 | Baldwin | 364/521 |
| 5,005,128 | 4/1991 | Robins et al. | 364/424.02 |
| 5,124,535 | 6/1992 | Kocznar et al. | 235/382 |

*Primary Examiner*—Eugene R. LaRoche
*Assistant Examiner*—Christopher R. Glembocki
*Attorney, Agent, or Firm*—Philip M. Shaw, Jr.

[57] ABSTRACT

A card having retroreflective bar codes is comprised of a card substrate on which there are provided a first information recording portion formed of a retroreflective material portion of a predetermined pattern and a second information recording portion which can be read out from a nearby place. Also, a card having retroreflective bar codes is formed of recorded tracks comprised of retroreflective material portions and nonretroreflective portions which are formed on a heat distortion material formed of a retroreflective member or retroreflective material by a selective heating and distortion process in response to information to be recorded.

20 Claims, 9 Drawing Sheets

CARD HAVING RETROREFLECTIVE BAR CODES AND A MAGNETIC STRIPE

This is a continuation of application Ser. No. 07/509,050 filed on Apr. 13, 1990 now abandoned.

BACKGROUND OF THE INVENTION

1. Field of the Invention

The present invention relates generally to cards such as cash cards, credit cards, ID cards, security cards and the like. More particularly, this invention relates to a card having an information recording portion.

2. Description of the Prior Art

The following cards having a portion in which information can be recorded are known in the prior art: A card in which magnetic stripes are formed on one surface of a card substrate and information is magnetically recorded on the magnetic stripes; a card in which a microcomputer formed of a semiconductor integrated circuit (IC) is incorporated within the card substrate and information is recorded (stored in a memory of the microcomputer, etc.).

The card having such information recording portion is now widely used as a card for withdrawing money, placing a deposit or confirming a balance, a credit card, an employee ID card, a student card, a so-called prepaid card, etc.

Upon use, such a prior art card is introduced into an information reading apparatus (i.e., card reader), whereby recorded information is read out from the card. Accordingly, such recorded information cannot be read out from a remote place, i.e. a place which is at a distance from the card itself.

To solve this problem, the assignee of the present application has previously proposed a bar code by which the user can read out information recorded on a card from the remote place. U.S. Pat. No. 5,091,636, issued on Jun. 3, 1991, to the present invention and Shosuke Tankaka, both employees of the assignee of the present application describes this bar code. See also the present inventor's prior U.S. Pat. No. 5,118,930, issued Jun. 2, 1992. In this previously proposed bar code, the life span of the recorded information is long and is weatherproof. The signal-to-noise ratio (S/N ratio) is excellent and the recorded information can be prevented from being deteriorated in quality by transfer and magnetization. In particular, as described above, the most specific feature of this bar code lies in the fact that the recorded information can be read out from a very distant place.

Such a bar code makes effective use of a so-called retroreflective material, wherein stripes made of retroreflective material are provided in conjunction with black bars (or white bars) of bar code printed on a prior art sheet of paper or the like and the spacing between the stripes is determined in correspondence with the width of the white bars (or black bars). According to this bar code, when a light is irradiated on the bar code from a place distant from the bar code by several meters or several 10's of meters, a reflected light is obtained from the retroreflective material in substantially the same direction as that of the incident light.

The above-mentioned bar code is constructed as follows: A stripe-shaped retroreflective material (stuck to a mount) formed of a set of glass beads, plastic beads, micro-prisms, fly-eye lens or the like is stuck to a base plate with a predetermined spacing or a plurality of stripe-shaped retroreflective materials (stuck to a mount) are unitarily formed with a frame made of retroreflective material, thereby being stuck to a base plate. Alternatively, the above-described bar code is formed such that a cover film in which transparent stripes and opaque stripes are formed so as to form a bar code is stuck to a sheet formed of a sheet of retroreflective material. Japanese Laid-Open Utility Model Gazette No. 50-154747 describes this type of retroreflective sheet.

Recently, it is a general trend that a user may own several cards in which a variety of information is recorded. However, as the number of cards is increased, the more the administration of cards becomes cumbersome. Therefore, it is earnestly desired that as much information as possible be recorded (i.e., stored) in a single card.

Now, let us consider a company ID card by way of example. The employee's name, employee No., employee's position or division, employee's photo, etc., are printed on one side of the company ID card and magnetic stripes in which information (i.e., data) such as the employee's name, employee No., employee's position and so on are magnetically recorded on the other side of the card. Upon use, the information recorded on the magnetic stripes is read out by a card reader so that the card is utilized as a time-recorder card and an after-paid card in the company dining room.

On the other hand, in most cases, the employee is requested to carry the company ID card whenever entering the company building and other company facilities. Generally, the identity of the person presenting the company ID card is visually confirmed by the guard. In that case, if the data such as the employee's name, employee No. and so on recorded on the company ID card are read out by a card reader, the confirmation of the company ID card by the guard becomes unnecessary and also the confirmation becomes highly reliable. However, when the information recorded on the company ID card are read out by a card reader at an unmanned entrance into the company building, those who do not carry the company ID card may also be permitted to enter. However, if the information recorded on the company ID card can be read out from a manned, but remote place, the comings and goings to the company building, the company facilities or the like can be positively confirmed by a machine.

OBJECTS AND SUMMARY OF THE INVENTION

Therefore, it is a general object of the present invention to provide an improved card in which the above-described defects encountered with the prior art can be eliminated.

More specifically, it is an object of the present invention to provide a card in which recorded information can be read out both from a distant place and a nearby place.

It is another object of the present invention to provide a card in which the kinds of information to be recorded therein can be considerably increased.

It is still another object of the present invention to provide a card in which the kinds of information to be recorded therein can be considerably increased.

It is still another above of the present invention to provide a card in which an object distant from several meters to several 10's of meters can be controlled in a remote fashion.

It is a further object of the present invention to provide a card in which a card owner can be checked twice by first and second information recorded portions.

It is a still further object of the present invention to provide a card which can be applied to a voting system.

It is a still further object of the present invention to provide a card in which the safety of the card can be considerably increased.

It is a still further object of the present invention to provide a batteryless information card so that the card can be made inexpensively.

It is a yet further object of the present invention to provide a card in which the life span of the information recorded therein is long.

It is a yet further object of the present invention to provide a card in which the quality of the information recorded therein is excellent, is weatherproof and has a high signal-to-noise ratio.

It is a yet further object of the present invention to provide a card in which recorded information can be prevented from being deteriorated in quality and can be prevented from being erased by transfer and magnetization.

It is an additional object of the present invention to provide a card in which information can be recorded and/or reproduced with ease by a simplified arrangement.

As a first aspect of the present invention, a card having retroreflective bar codes is comprised of a card substrate, a first information recording portion formed of a retroreflective material portion of a predetermined pattern, and a second information recording portion which can be read out from a nearby place, with the first and second information recording portions being provided on the card substrate.

As a second aspect of this invention, a card having retroreflective bar codes is characterized in that recorded tracks formed of retroreflective material portions and non-retroreflective portions are formed on a heat distortion material formed of a retroreflective member or retroreflective material by a selective heating and distortion process in response to the information to be recorded.

The above, and other objects, features and advantages of the present invention, will be apparent in the following detailed description of preferred embodiments when read in conjunction with the accompanying drawings, in which like reference numerals are used to identify the same or similar parts in the several views.

DETAILED DESCRIPTION OF PREFERRED EMBODIMENTS

The present invention will now be described in detail with reference to the accompanying drawings.

Figure 1:
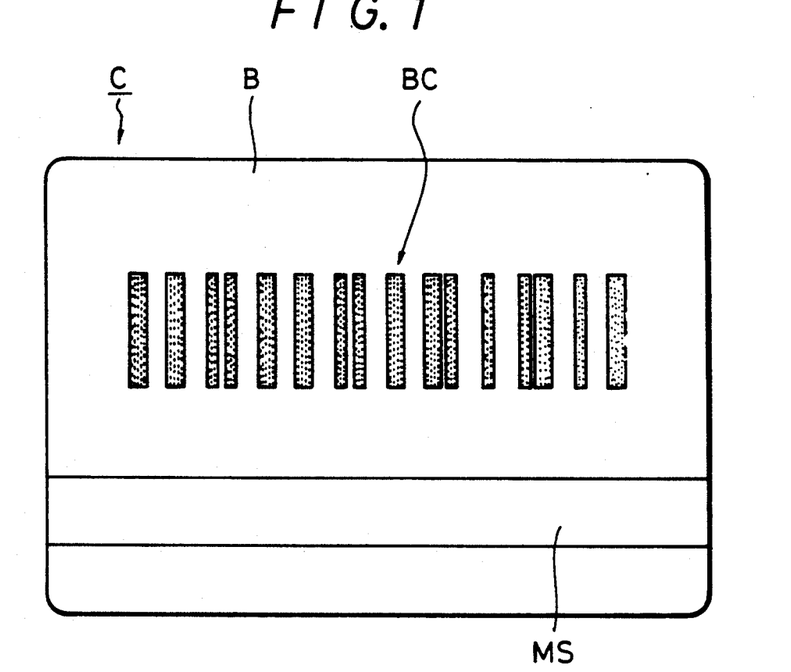
FIG. 1 is a planar view of a first embodiment of a bar code according to the present invention.

Referring to the drawings in detail and initially to FIG. 1, there is shown a first embodiment of a card C according to the present invention. In the card C, a bar code (a first information recording portion) BC formed of a retroreflective material (a bright portion in FIG. 1) of a predetermined pattern and a magnetic stripe (a second information recording portion) MS are provided on one side of a card substrate B with a predetermined spacing in parallel to the longitudinal direction of the card C.

When this card C is, for example, the company ID card, information such as employee's name, employee No., employee's position and so on are converted to binary coded data and recorded on the bar code BC and the magnetic stripes MS in a spaced apart arrangement. The bar code BC formed of the retroreflective material in the predetermined pattern can be additively provided on a ready-made card in which the magnetic stripes are already formed.

Figure 2:
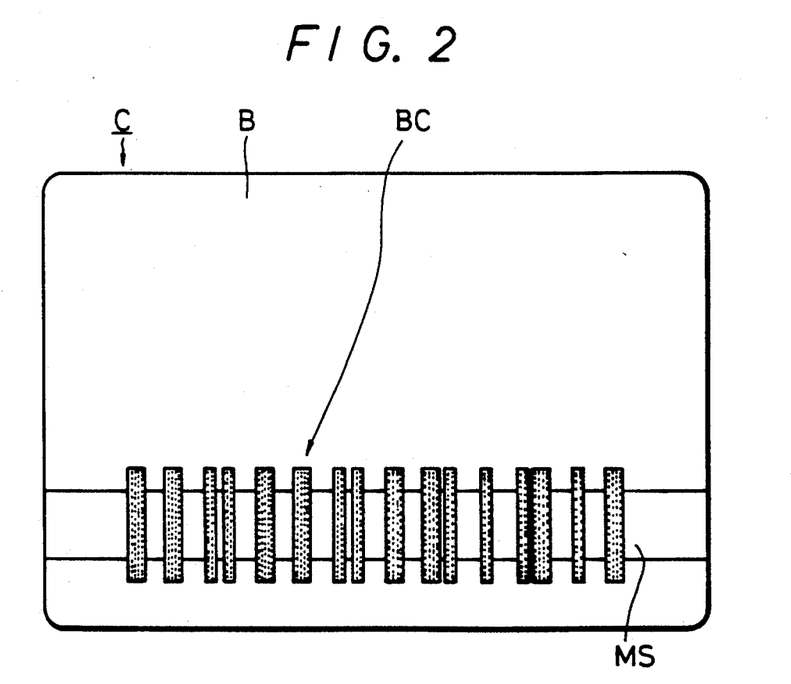
FIG. 2 is a planar view of a second embodiment of a bar code according to the present invention.

FIG. 2 shows a second embodiment of a card C according to the present invention. In FIG. 2, like parts corresponding to those of FIG. 1 are marked with the same references and therefore need not be described in detail.

As shown in FIG. 2, the magnetic stripe MS is formed on one side of the card substrate B and the bar code BC formed of the retroreflective material (bright portion in FIG. 2) of a predetermined pattern is superposed on the magnetic stripe MS.

Conversely, the bar code BC formed of the retroreflective material (bright portion) of the predetermined pattern can be formed on one side of the card substrate B and the magnetic stripe MS can be superposed upon the bar code BC.

Further, the bar code BC and the magnetic stripe MS can be respectively formed on opposite sides of the card substrate B.

Furthermore, the first information recording portion formed of the retroreflective surface of the predetermined pattern is not limited to a bar code and can be freely selected from various ones of desired patterns such as CALRA code or the like.

Figure 21:
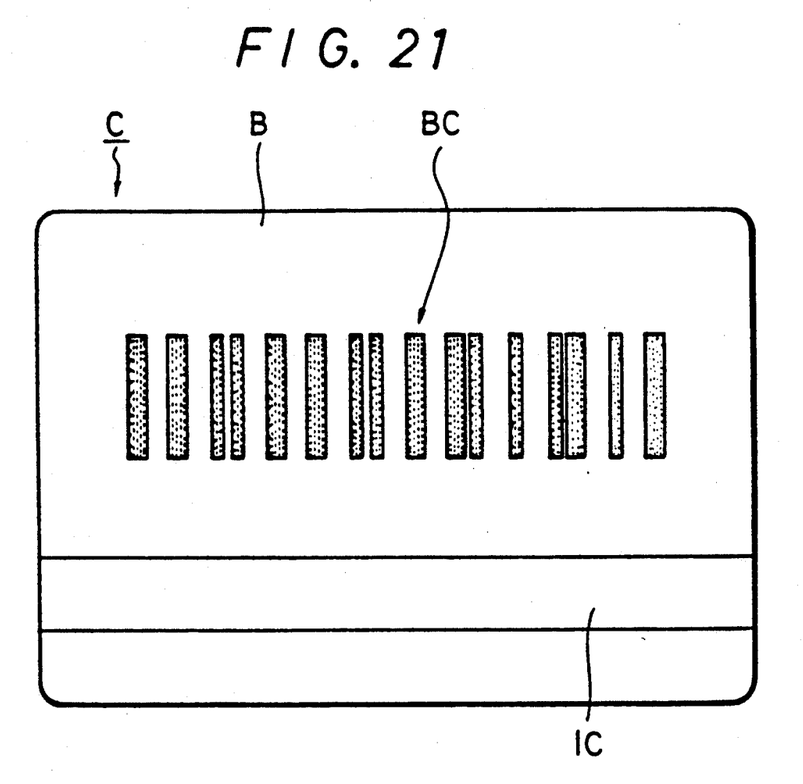
FIG. 21 is a planar view of an eighth embodiment of the present invention.

In addition, as shown in FIG. 21, the second information recording portion can be a microcomputer formed of a semiconductor IC in which information is recorded in a memory, a semiconductor memory in which information is recorded (or stored), or the like.

Furthermore, the card can be used in a wide variety of fields, such as a bank card (drawing a deposit, placing a deposit and confirming a balance or the like), a credit card, a company ID card, a student ID card, a prepaid card, a security card and so on.

Referring to FIGS. 3 to 10, let us describe a concrete arrangement of a bar code provided as an information recording portion formed of a retroreflective material of a predetermined pattern and a card reader system therefor.

Figure 3:
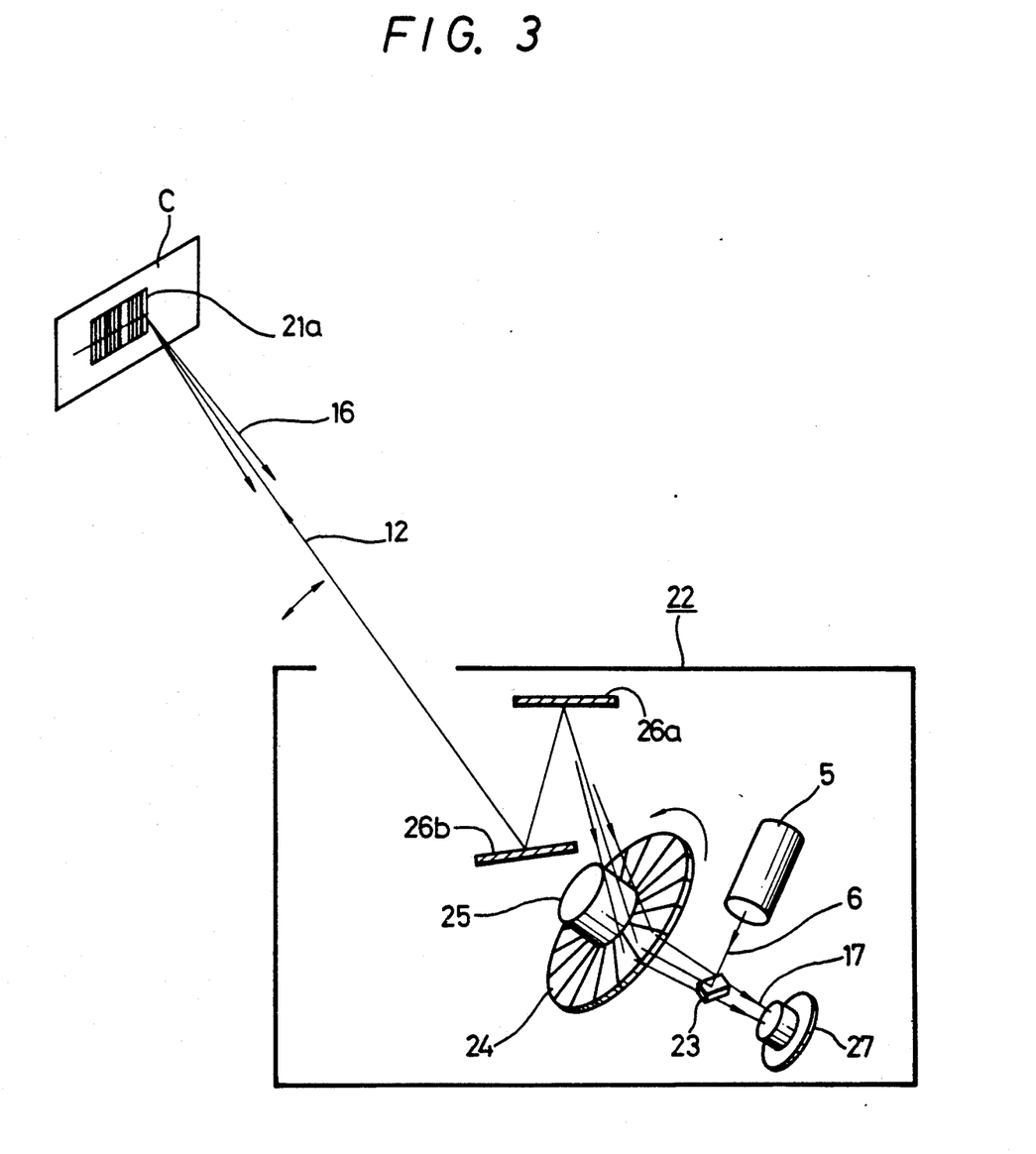
FIG. 3 is a perspective view of a system by which information recorded on information record portions are read out.
Figure 4:
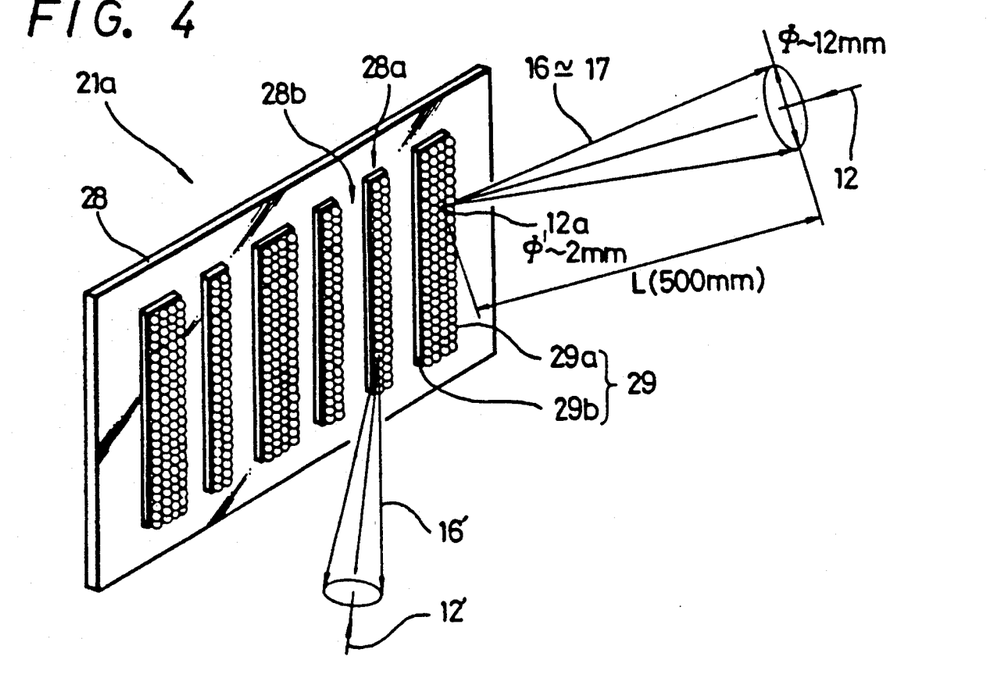
FIG. 4 is a perspective view of a thirdembodiment of a bar code according to the present invention.

FIG. 3 shows an example of a card reader system of the present invention, whereas FIG. 4 shows a first example of a bar code. A card C shown in FIG. 3 is provided with a bar code (bar code of beads-type) 21a which is formed of a retroreflective material shown in FIG. 4. In the card C of FIG. 3, a magnetic stripe is not shown.

Referring to FIG. 4, there is shown a card substrate 28. A retroreflective material 29 is stuck to a bright portion 28a on the card substrate 28. The bright portion 28a reflects light incident thereon. A dark portion 28b of the card substrate 28 is left unchanged because it is not needed to reflect incident light. The dark portion 28b can be formed by a printing process of black color having a light absorption property or the like. The retroreflective material 29 is formed by depositing a number of very small glass beads 29a on a mount 29b made of paper or the like without any spacing at all, so as to reflect light. The retroreflective material 29 acts to reflect light 16' to substantially the incident direction when a scanning light beam becomes incident on the retroreflective material 29 from the direction shown by an arrow 12' in FIG. 4. The light is reflected back in the direction shown by the arrows.

For example, when a glass bead, selected by a sieve of 200 meshes per inch, is selected as the glass bead 29a, or the glass bead diameter d is above 0.1 mm, the experimental results show that when the scanning light beam 12 is focussed as a beam spot 12 having a beam diameter $\phi'$ of about 2 mm on the retroreflective material 29 and a distance L from the beam spot 12a is about 500 mm, the reflected light 16 is distributed as a circle having a diameter $\phi$ of about 12 mm substantially around the incident direction of the scanning light beam 12. Accordingly, the reflected light 16 is changed into an effective reflected light 17 which, as shown in FIG. 3, is a component directed into a light receiving element 27.

Calculating a solid angle $\omega$ of the reflected light 16 in FIG. 4 yields $$\omega \approx \pi \times 10^{-4} (sr)$$

The power P of an effective reflected light 17 in FIG. 4 and a power $P_\phi$ of the effective reflected light in the prior art bar code formed by the printing process are in inverse proportion to each other. Assuming that a solid angle $\omega_\phi$ of a reflected light on a prior art bar code formed by a printing process is about ½ of a hemisphere, or $\omega_\phi \approx \pi/2$ (sr) is established, then $P/P_\phi \approx \omega_\phi/\omega \approx 5 \times 10^{-3}$. Therefore, it is to be understood that the power P of the reflected light 17 is increased about more than 1000 times as compared with the power $P_\phi$ of the prior art. The experimental results done by the assignee of the instant application demonstrate data which prove the above-described increase of power.

Figure 6:
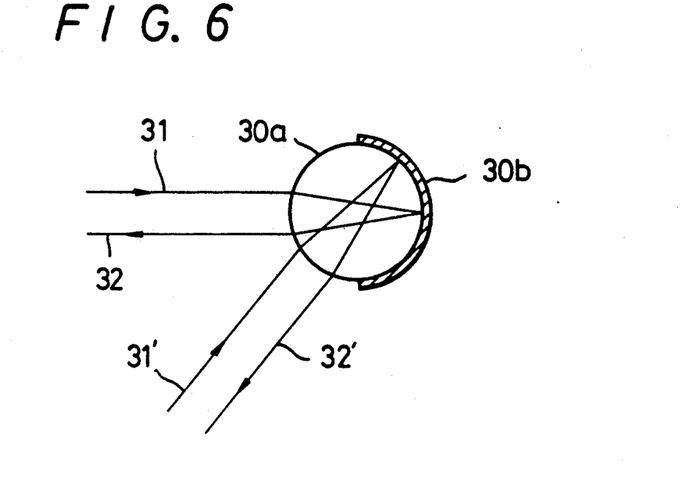
FIG. 6 is a side view to which reference will be made in explaining a fundamental principle of a bar code of the beads-type shown in FIG. 4.

Referring to FIG. 6, let us explain how the retroreflective material 29 is given its retroreflective property by utilizing the glass beads 29a of FIG. 4.

In FIG. 6, reference numeral 30a depicts a cross section of a glass ball and 30b an aluminum-deposited portion. When a light beam 31 is incident on the glass ball 30a, this incident light 31 is refracted by the glass ball and becomes incident on the aluminum-deposited portion 30b. Then, a reflected light 32 is reflected back to substantially the direction of the incident light 31 due to the refraction of the glass ball and the reflection on the aluminum-deposited portion 30b. Although the incident light 31 and the reflected light 32 do not become parallel to each other perfectly, if the wavelength of the incident light is constant, it is possible to make them parallel to each other by properly selecting the refractive index of the glass ball. Further, when the incident light becomes incident on the glass ball 30a from the direction shown by an arrow 31', the reflected light is reflected back to the direction (shown by an arrow 32') substantially parallel to the direction shown by an arrow 31' similarly as described above. Thus, it is to be understood that, regardless of the direction of the light incident on the left hemisphere of the glass ball 30a, the reflected light is reflected back to substantially the incident direction, thus the beads being rendered as having a retroreflective property.

This is also true even when the diameter of the glass ball 30a is reduced. Further, even when an adhesive agent having a different refractive index from that of the glass ball 30a or the like is attached to the glass ball 30a instead of the aluminum-deposited portion 30b, a reflection of a certain degree is presented. Therefore, it is to be understood that the beads-type bar code is given a retroreflective property by the so-called micro-prism property. In that case, the particle size d and the refractive index n of the glass bead 29a are determined by adjusting the wavelength region of the scanning beam used and a minimum line width of a bar code used.

Furthermore, in FIG. 4, the glass bead 29a can be directly deposited on the substrate 28 by a printing process.

Referring back to FIG. 3, let us explain an action of the bar code of this embodiment.

As shown in FIG. 3, there is provided a bar code reader 22 that is used to read out the bar code: In the bar code reader 22, a laser beam 6 emitted from a laser tube 5 is introduced into a very small half mirror 23, in which one portion of the laser beam 6 is reflected and becomes incident on a hologram disc 24. The hologram disc 24 is constructed such that diffraction gratings whose spatial frequency is successively changed are arranged on the circumference at an equal pitch. When the hologram disc 24 is rotated by a motor 25, the laser beam 6 is converted to a scanning light beam 12. The scanning light beam 12 is changed in direction by reflection mirrors 26a and 26b and scans the bar code 21a. The reflected light 16 from the bar code 21a is converged by the hologram disc 24 through the reflection mirrors 26a and 26b and is thereby introduced into the light receiving element 27 such as a photo diode or the like.

The bright portion 28a of the bar code 21a has a retroreflective property so that the reflected light 16 on the bright portion 28a becomes substantially the effective reflected light 17. More specifically, the solid angle of the reflected light 16 is less than about 1/1000 that of the prior art and the power of the reflected light 17, i.e., the output signal of the light receiving element 27 becomes 1000 times higher than that of the prior art. Accordingly, it is not necessary to use an expensive apparatus such as a photo multiplier tube or the like as the light receiving element 27. Further, an amplifying circuit can be considerably simplified in construction.

Further, the bar code 21a is retroreflective so that, even if it is not correctly opposed to the bar code reader 22, the code 21a can still be positively identified because the power of the effective reflected light 17 is substantially the same as that in a prior art card which correctly opposes the bar code reader 22. Furthermore, the S/N ratio of the signal is improved so that, when the card C is moved at high speed and when the card C and the bar code reader 22 are at some distance from each other, the code 21a can still be identified positively.

A second example of a bar code will be described with reference to FIG. 5.

Figure 5:
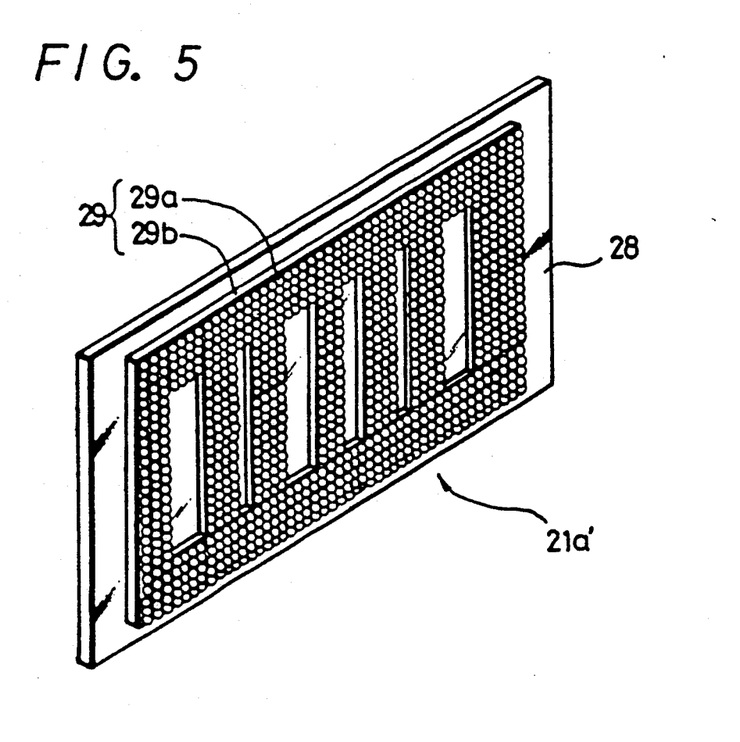
FIG. 5 is a perspective view of a fourth embodiment of a bar code according to the present invention.

FIG. 5 shows a bead-type bar code 21a' of a negative type in which a bright portion and a dark portion of the bar code are reversed with respect to those of FIG. 4. In this bead-type bar code 21a', portions corresponding to the bright portions 28a of FIG. 4 are removed from the retroreflective material portion 29 formed of the glass beads 29a and the mount 29b stuck to the base plate 28. The negative-type bar code has a wide area to reflect light so that is advantageous for finding out the place where the code is located.

A third example of bar code will be described with reference to FIG. 7.

Figure 7:
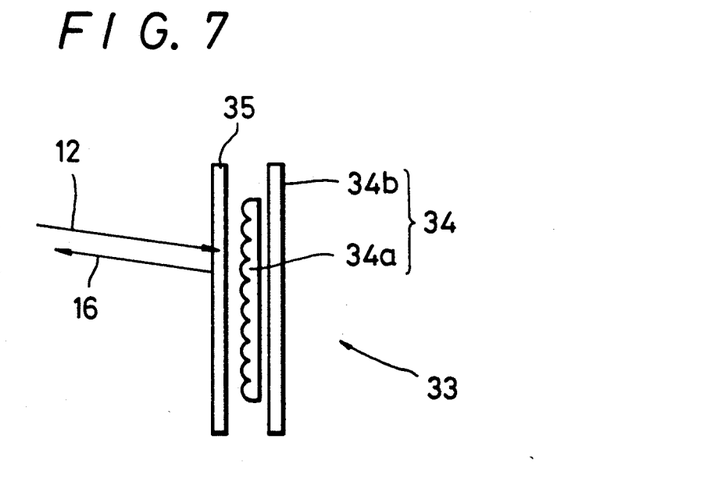
FIG. 7 is a side view of a fifth embodiment of a bar code according to the present invention.

As shown in FIG. 7, there is provided a bar code 33 which might be formed of a so-called fly-eye lens type. A retroreflective material portion 34 thereof is composed of a fly-eye lens 34a formed of a number of very small lenses and a reflection mirror 34b so that a scanning light beam 12 on the bar code 33 is reflected substantially to the incident direction as a reflected light 16. In a portion corresponding to a dark portion of the bar code, there is provided a medium which absorbs or scatters a light instead of the fly-eye lens 34a. In this embodiment, an infrared ray transmissive filter 35 is provided at the front surface of the fly-eye lens 34a, whereby the bar code can be formed as a hidden bar code that cannot be visually identified.

A principle of the bar code 33 of the third example will be explained with reference to FIG. 8.

Figure 8:
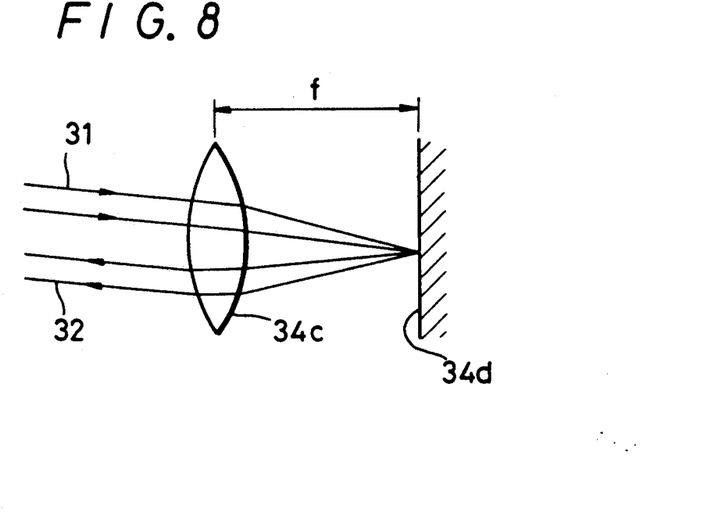
FIG. 8 is a side view to which reference will be made in explaining a fundamental principle of a bar code of a fly-eye lens type shown in FIG. 7.

Referring to FIG. 8, there are provided a convex lens 34c and a reflection mirror 34d which is located on the focal plane of the convex lens 34c. This arrangement of the convex lens 34c and the reflection mirror 34d constructs a so-called cat's-eye to have a retroreflective property, whereby an incident light 31 is reflected back to the direction parallel to the incident direction as a reflected light 32. Therefore, it is to be noted that the fly-eye lens type bar code 33 of FIG. 7 is given a retroreflective property because the fly-eye lens type bar code of FIG. 7 is equivalent to the arrangement in which a number of very small cat's-eye lens are provided.

A fourth example of the bar code will be described with reference to FIG. 9. In the fourth example, a bar code, which is depicted by reference numeral 36 in FIG. 9, is a code variable bar code whose code can be varied by a mechanical shutter.

Figure 9:
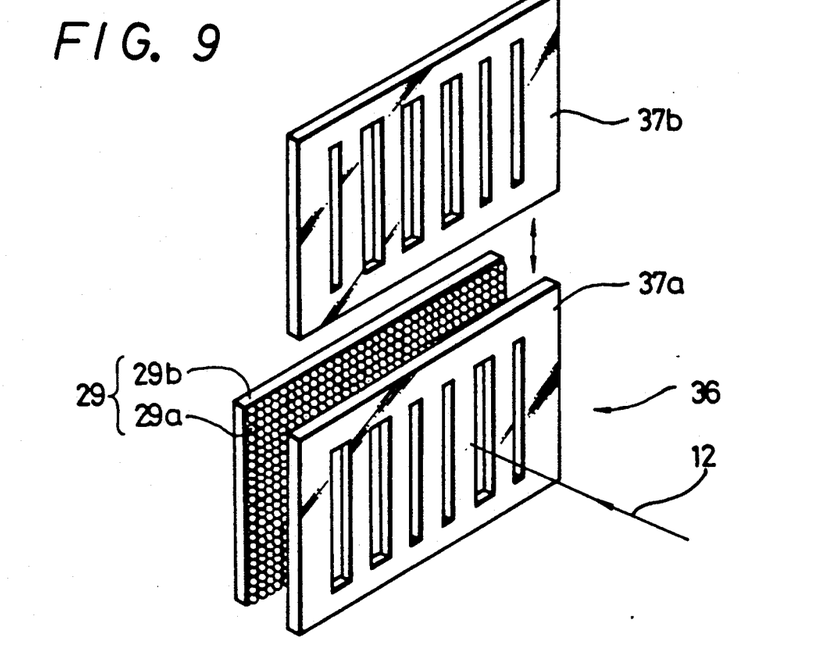
FIG. 9 is a perspective view of a sixth embodiment of a bar code according to the present invention.

As shown in FIG. 9, in the code variable bar code 36, a retroreflective material portion 29 formed of the glass beads 29a and the mount 29b is provided at the rear front surface thereof and a detachable code plate 37a is provided at the front surface thereof. In the code plate 37a, portions corresponding to the bright portions of the bar code are cut-away to form rectangular slots.

According to this embodiment, there is provided a code plate 37b in which codes different from those of the code plate 37a are formed. When the code plate 37a is replaced with the code plate 37b, it is possible to display different codes in response to cards having bar codes and work situations.

A fifth example of the bar code will be described with reference to FIG. 10.

Figure 10:
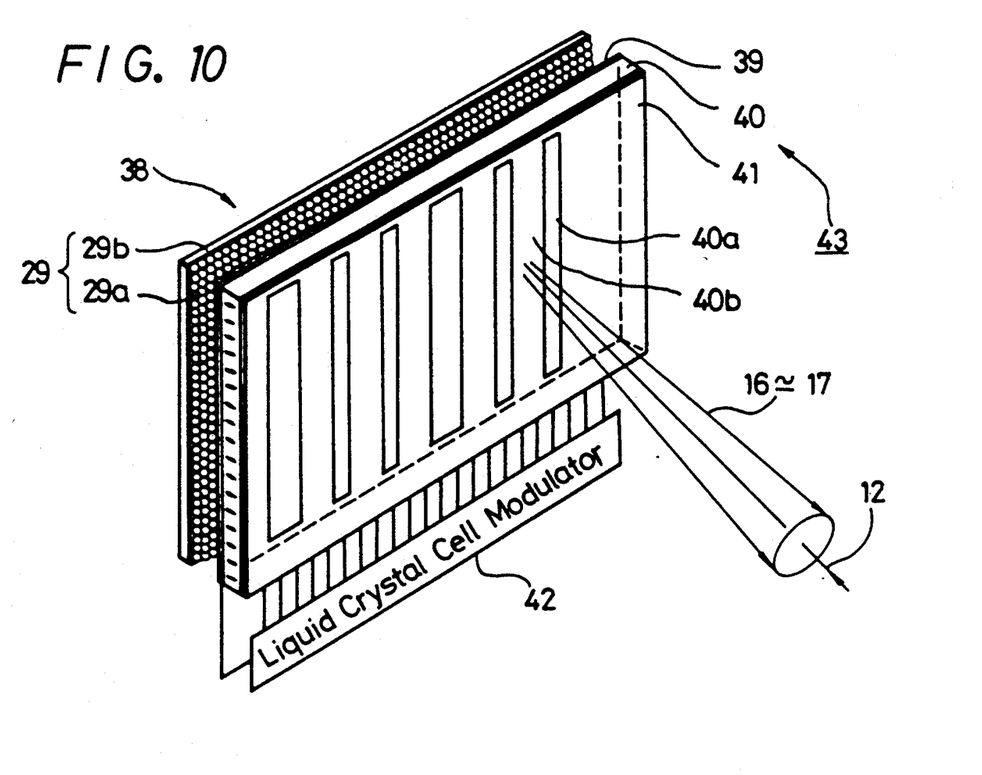
FIG. 10 is a perspective view of a seventh embodiment of a bar code according to the present invention.

In FIG. 10, reference numeral 38 generally designates a bar code in which codes can be modulated by an optical shutter that can be switched electrically. Referring to FIG. 10, in the bar code 38, a retroreflective material portion 29 formed of glass beads 29a and a mount 29b on which a number of glass beads 29a are formed is provided at the rear surface thereof and an electrical optical shutter 43 which can vary the displayed codes is provided at the front surface thereof. The electrical optical shutter 43 is comprised of a polarizing plate 39, an TN-effect type liquid crystal cell 40, a polarizing plate 41 whose polarizing direction is perpendicular to that of the polarizing plate 39 and a liquid crystal modulator 42 which drives an electrode corresponding to a predetermined code in the liquid crystal cell 40. In the liquid crystal cell 40, a portion 40a to which is applied an alternating current, interrupts the light by the action of the polarizing plates 39 and 41, whereas a portion 40b, which is not subjected to the alternating current, allows the light to pass therethrough. Consequently, the scanning light beam 12 incident on the portion 40b reaches the retroreflective material portion 29 which produces the reflected light 16 reflected in substantially the same direction as the incident direction. This reflected light 16 becomes the effective reflected light 17.

In this embodiment, the effective reflected light 17 is considerably improved and the code can be modulated at high speed. The cell 40 is not limited to a liquid crystal cell and an ECB (electric field control birefractive)-type liquid crystal cell, for example, can be used. In that case, the polarizing plate 39 can be removed. Further, the electrical optical shutter 43 is also not limited to the above and can be freely changed.

According to the present invention, as set forth above, the following effects and advantages can be achieved:

(1) Recorded information can be read out remotely as well as locally;

(2) The kind of information which can be recorded in a single card can be increased;

(3) An information recording portion formed of a retroreflective material portion of a predetermined pattern can be easily, additively attached to a ready-made card having an information recording portion suitable for read out at nearby place and can be utilized in a wide variety of purposes, so that the resultant card is usable for other purposes in a restricted application range;

(4) The reflectivity of the information recording, predetermined pattern of retroreflective material is considerably high and the incident light is reflected in substantially the same direction as the incident direction regardless of the incident angle. Therefore, it becomes possible to read out the code from a place distant from the code by several meters to several 10's of meters. Accordingly, the identity of the user carrying the card can be confirmed at an entrance or exit of a building, company facilities or the like by a machine (card reader) in an unmanned fashion. Also, the user can use the card to remotely control a controlled object located distant from the user by several meters to several 10's of meters such as when the door of a garage is opened and/or closed;

(5) Because information is read out from the information recording portion formed of the retroreflective material portion of a predetermined pattern and from the information recording portion from which information can be read out at a nearby place, the identity of the card owner can be checked twice;

(6) The retroreflective material information recording portion can be formed on both sides of a card substrate and "NO" and "YES" information can be recorded on these two sides, thus making it possible to cast a vote in an assembly and to automatically count the number of votes;

(7) The security of the card can be considerably increased by the information recording portion formed of retroreflective material portion of predetermined pattern and the information recording portion suitable for nearby reading; and (8) The card substrate can be provided with an information recording portion formed of a predetermined pattern of retroreflective material and the nearby reading information recording portion, such as a magnetic, a magneto-optical, or an optical-type stripe or the like, so that a built-in battery is unnecessary and the price of card is reduced very much.

Now, let us explain the embodiments of an information recording medium, an information recording method and an information recording apparatus of the present invention.

Initially, an example of each of the information recording method and the information recording medium will be described with reference to FIGS. 11A and 11B.

Figure 11A:
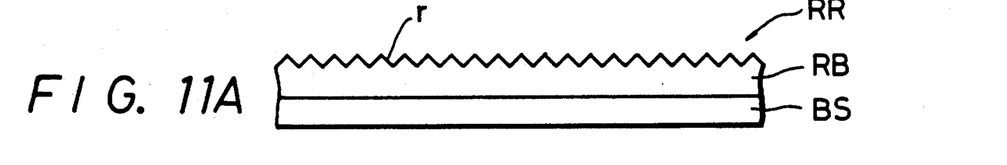
FIGS. 11A and 11B are diagrammatic, vertical sectional views to which reference will be made in explaining an information recording method and an information record medium of the invention, respectively.

FIG. 11A shows an information record medium VIRM in which information is not yet recorded. This unrecorded medium VIRM is constructed such that, as shown in FIG. 11A, a heat distortion retroreflective material portion RR in which a number of retroreflective element portions r formed of microprisms of quadrangular cones whose apical angle in cross section is 90 degrees, are formed on the whole surface of a retroreflective base portion RB. The base portion RB is stuck to a transmissive (transparent) base BS formed at a plastic material or the like. In that case, the base BS can be removed.

Figure 11B:
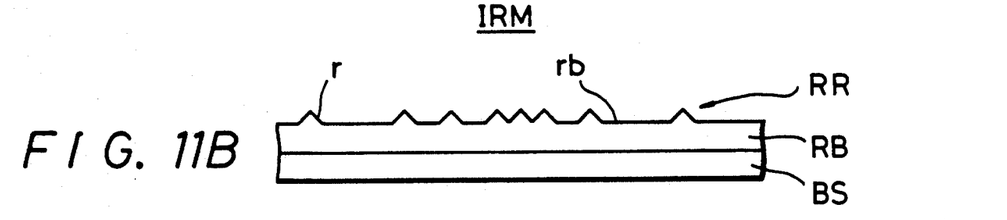
Figure 13:
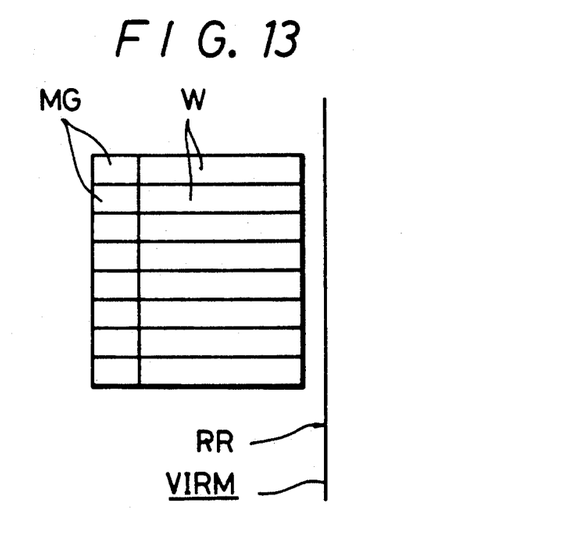
FIGS. 13 and 14 are schematic diagrams showing examples of a recording apparatus used in the present invention.

In the portion RR, as shown in FIG. 11B, wires W aligned in, for example, a recording apparatus shown in FIG. 13 are heated by electric currents whose magnitudes represent the information to be recorded and are urged to selectively strike the portion RR by electromagnets MG, whereby the retroreflective material portion RR is selectively heated and pressed to thereby selectively crush the retroreflective elements r, thus forming non-retroreflective portions rb (FIG. 11B). Accordingly, a recorded information medium IRM (FIG. 11B) is formed, in which recorded tracks formed of sets of the retroreflective element portions r and recorded tracks formed of the non-retroreflective portions rb are constructed.

When the information recorded on the medium IRM is reproduced, a fine light such as a laser beam is irradiated on the medium IRM from the base BS side in a scanning-fashion and the reflected light therefrom is detected as the reproduced information. The reflected light is high in intensity in the retroreflective material portion RR and is low in intensity in the non-retroreflective material portion rb.

Figure 12:
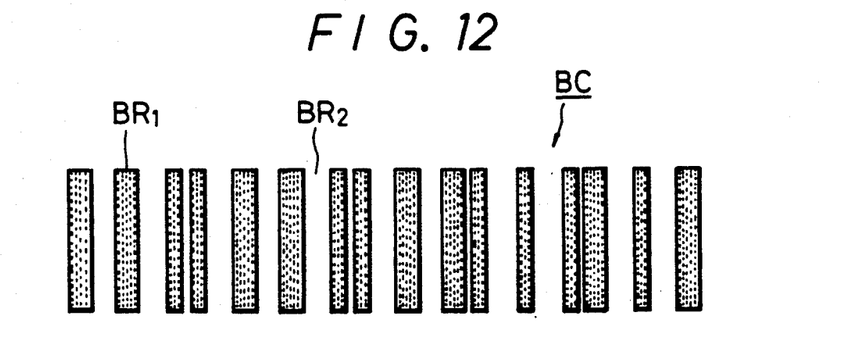
FIG. 12 is a planar view of a bar code of an eighth embodiment of the present invention.

FIG. 12 shows an example of a bar code as an information record medium thus formed. In FIG. 12, reference letter BC generally represents a bar code which is comprised of first and second bars $BR_1$ and $BR_2$ which correspond to a black bar and a white bar or a white bar and a black bar of a prior art bar code formed by the printing process. The first and second bars $BR_1$ and $BR_2$ are respectively formed of the retroreflective material portion RR and the non-retroreflective material portion rb.

Figure 14:
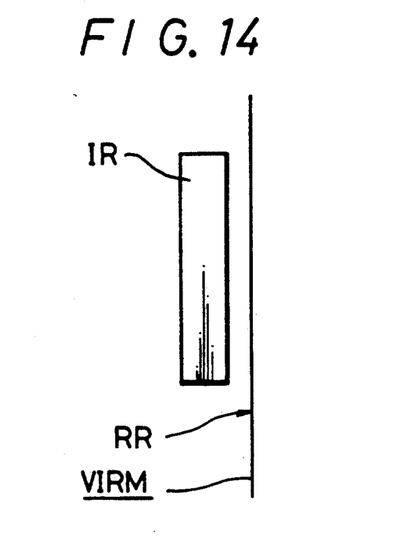

When the above-described bar code BC is obtained, all wires W in the recording apparatus of FIG. 13 are heated by electric currents and strike the retroreflective material portion RR of the unrecorded medium VIRM at the portion corresponding to the first bar BR1. Alternatively, as shown in a recording apparatus of FIG. 14, a heating member (generating heat when conducted) IR whose opposing portion is line-shaped or band-shaped is pressed upon the retroreflective material portion RR of the unrecorded medium VIRM.

Figure 15A:
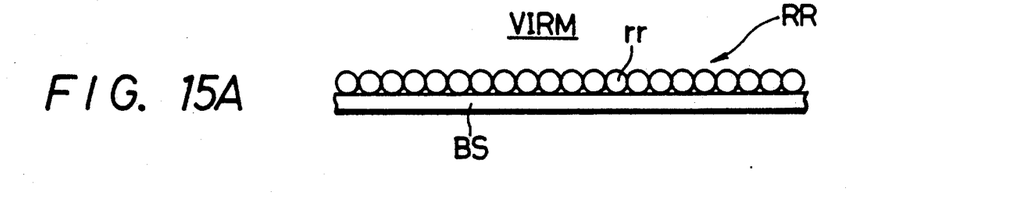
FIGS. 15A and 15B are diagrammatic, vertical sectional views to which reference will be made in explaining examples of unrecorded media used in the present invention.

Further, the retroreflective material portion RR of the unrecorded medium VIRM can be constructed such that, as shown in FIG. 15A, a number of ball-shaped retroreflective elements rr are stuck to the transmissive (transparent) base BS made of plastic material. When the recorded information is read from a recorded medium of this type, a fine light such as a laser beam is irradiated on the medium from the base BS or the retroreflective material portion RR side in a scanning-fashion and the reflected light therefrom is detected. When the base BS is formed of an opaque material, the fine light must be irradiated from the retroreflective material portion side.

Figure 15B:
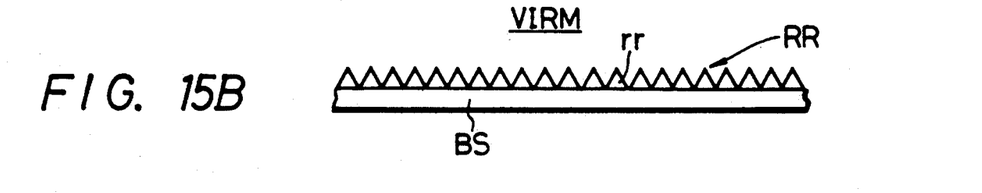

As shown in FIG. 15B, the retroreflective material portion RR can be constructed such that a number of retroreflective elements rr formed of microprisms (hemispheres can be utilized), formed of quadrangular cones whose apical angle is 90 degrees in a cross section, are stuck to the transmissive (transparent) base BS made of plastic material.

When the recorded information is reproduced from a medium of this type, a fine light such as a laser beam is irradiated on the medium from the base BS side in a scanning-fashion and the reflected light is detected.

Figure 16:
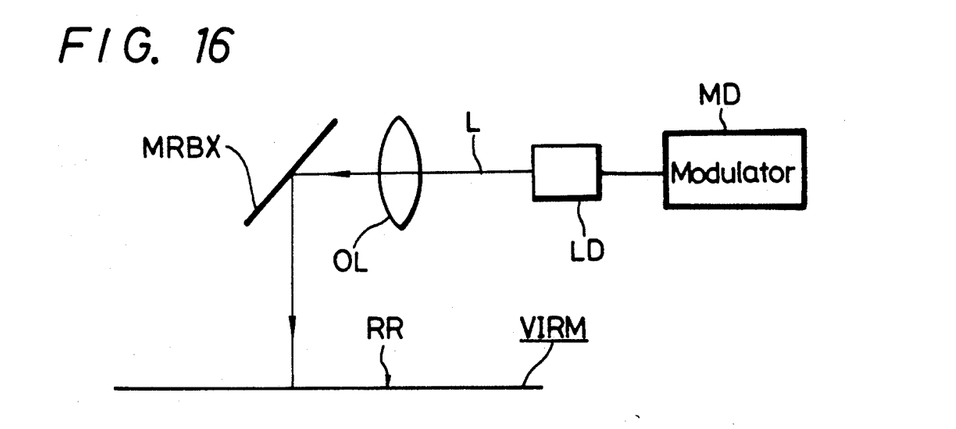
FIG. 16 is a schematic diagram showing other examples of a recording apparatus used in the present invention.

Another alternative method of recording information in the retroreflective material portion RR of the unrecorded medium VIRM, as shown in FIG. 11B, is to modulate a drive signal for driving a laser diode LD of, for example, a recording apparatus shown in FIG. 16, by a modulator MD in response to a signal such as a video signal to be recorded. A fine light L from the laser diode LD is reflected by a double-spindle rotation mirror MRBX to thereby change the reflection angle thereof in response to a character, a video signal or the like and the resultant light is irradiated on the retroreflective material portion RR through an objective lens OL. This selectively melts the retroreflective elements r to form non-retroreflective material portions rb, thus making it possible to record the character, the video signal or the like.

Other examples of an information recording method and an information record medium will be described with reference to FIGS. 17A and 17B.

Figure 17A:
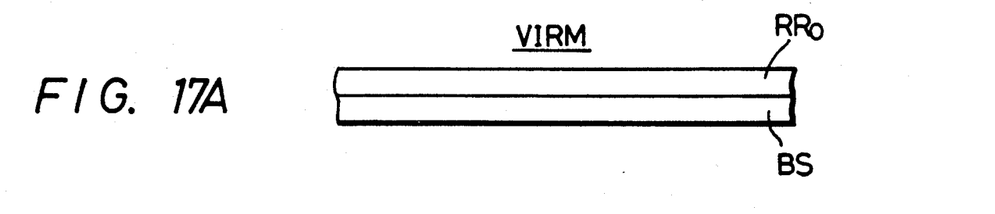
FIGS. 17A and 17B are diagrammatic, vertical sectional views showing other examples of an information recording method and an information record medium of the present invention.
Figure 18:
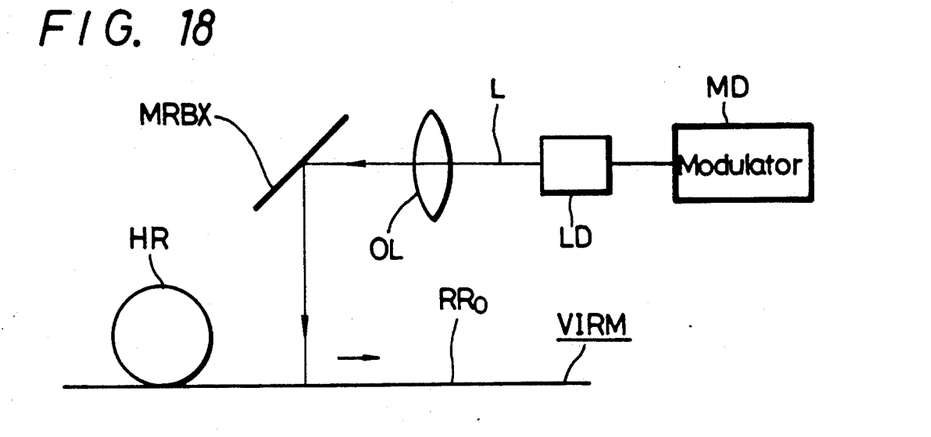
FIG. 18 is a schematic diagram showing another example of a recording apparatus used in the present invention.
Figure 19:
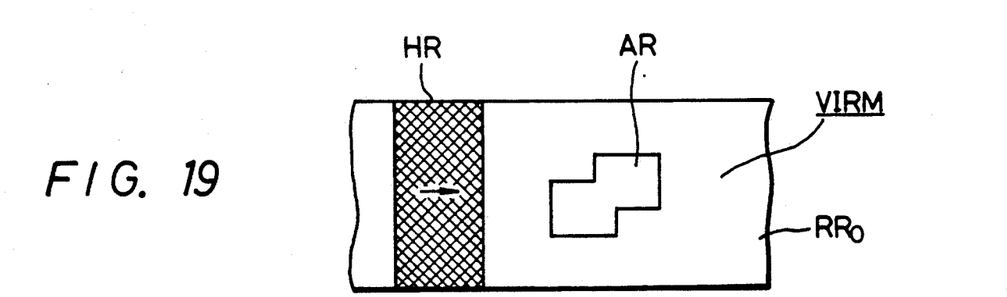
FIG. 19 is a planar view of FIG. 18.

FIG. 17A shows an unrecorded medium constructed such that a heat distortion retroreflective material $RR_0$ made of a transmissive (transparent) plastic material is struck to a transmissive (transparent) base BS made of a plastic material. In that case, the base BS can be removed Referring to FIGS. 17A, 17B, 18 and 19, the retroreflective material $RR_0$ of the unrecorded medium VIRM can be recorded on a recording apparatus shown in FIGS. 18 and 19. A drive signal for driving a laser diode LD is modulated by the modulator MD in response to signals such as a character signal, a video signal or the like to be recorded. This produces a modulated, fine signal L from the laser diode LD which is reflected by a double-spindle rotation mirror MRBX, whose reflection angle is changed in response to the character signal, the video signal or the like, and is irradiated on the retroreflective material $RR_0$ of the unrecorded medium VIRM through the objective lens OL. This heats the retroreflective material $RR_0$ and softens it.

Figure 17B:
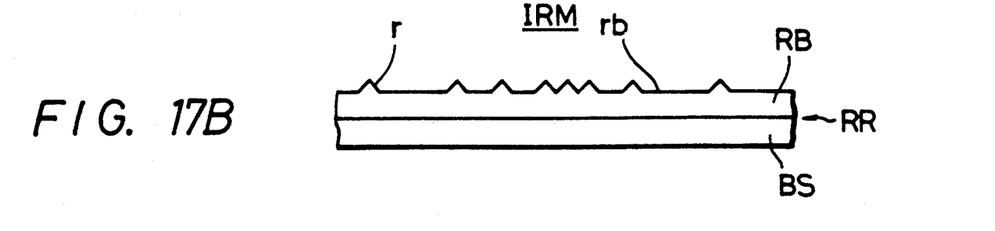

Thereafter, when a heating roller HR having a number of concave portions of quadrangular cone-shape whose apical angle is 90 degrees in cross section is rotated, a number of retroreflective microprism element portions r, each having an apical angle of 90 degrees in cross section, are formed as shown in FIG. 17B. Thus it is possible to obtain an information record medium IRM in which recorded tracks of the retroreflective material portions RR are formed of a set of the retroreflective portions r and the non-retroreflective portions rb.

To reproduce the information recorded on the information record medium IRM, a fine light such as a laser beam is irradiated on the information record medium IRM from the base BS side in a scanning-fashion and the reflected light is detected as the reproduced light information. The reflected light is high in intensity from the retroreflective material Rr and is low in intensity from the non-retroreflective portion rb.

Figure 20:
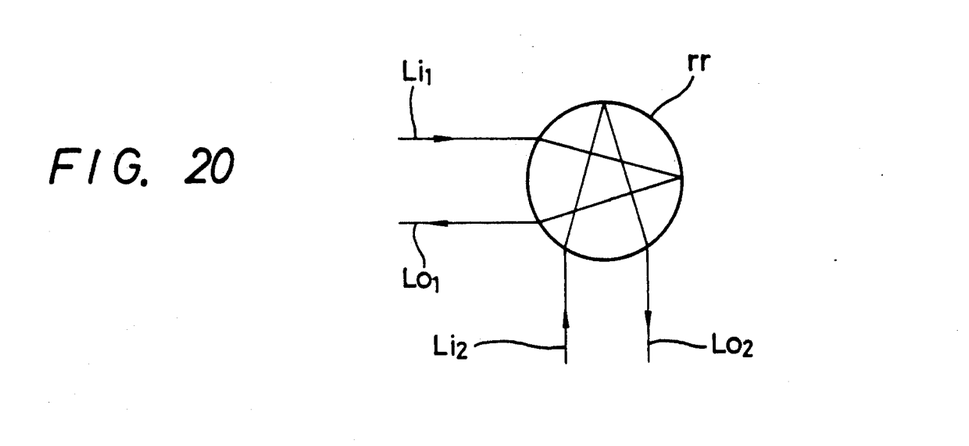
FIG. 20 is a schematic diagram to which reference will be made in explaining a fundamental principle of a retroreflective element.

Referring to FIG. 20, let us describe the function of the retroreflective element rr formed of glass beads, plastic beads or the like. When incident lights $Li_1$ and $Li_2$ of desired directions are introduced into the retroreflective element rr, there are obtained reflected lights $Lo_1$ and $Lo_2$ which are the same in direction but opposite in orientation to the lights $Li_1$ and $Li_2$, respectively. When the diameter of the retroreflective bead rr is about 2 mm and the reflected light is measured at a distance apart from the beam spot by 500 mm, the reflected lights are distributed in a circle of about 12 mm in diameter around substantially the incident light. Accordingly, this reflected light becomes an effective reflected light which becomes incident on a light receiving element of a photo detector (not shown). The power of the effective reflected light reaches more than 1000 times that of the power presented by the prior art bar code formed by the printed process.

According to the present invention, as set forth above, the life span of the recorded information is long, the weatherproof property and the S/N ratio thereof are excellent, and the recorded information can be prevented from being deteriorated in quality and can also be prevented from being erased by transfer and magnetization. In particular, it is possible to obtain an information record medium in which the recorded information can be read out from a considerably distant place and the information can be recorded and/or reproduced with ease by a simplified arrangement.

Having described preferred embodiments with reference to the accompanying drawings, it is to be understood that the invention is not limited to those precise embodiments and that various changes and modifications could be effected by one skilled in the art without departing from the spirit or scope of the novel concepts of the invention as defined in the appended claims.

I claim as my invention

1. A card having retroreflective bar codes comprising:
    (a) a card substrate;
    (b) a first information recording portion formed of a retroreflective material portion of a predetermined pattern, for reflecting a beam of incident light, as modulated in intensity by the predetermined pattern, to a distance of several meters from the card; and
    (c) a second information recording portion readable locally with respect to the card, the first and second information recording portions being provided on the card substrate.

2. A card having retroreflective bar codes according to claim 1, wherein the second information recording portion is comprised of a magnetically readable stripe.

3. A card having retroreflective bar codes according to claim 1, wherein the first information recording portion is formed of recorded tracks comprised of retroreflective material portions and non-retroreflective portions.

4. A card having retroreflective bar codes, according to claim 1, characterized in that the first information recording portion comprises recorded tracks of retroreflective material portions and non-retroreflective portions which are formed on a heat distortable, retroreflective material by a selective heating and distortion process in response to information to be recorded.

5. A card having retroreflective bar codes according to claim 1, wherein the first information recording portion is formed of a pattern of printed black portions, reflective portions, and glass beads having a diameter of at least 0.1 mm which are stuck on the reflective portions.

6. A card having retroreflective bar codes according to claim 1, wherein the first information recording portion is formed of a pattern of black portions, reflective portions, and lenses which are positioned over the reflective portions.

7. A card having retroreflective bar codes according to claim 6, wherein the lenses are fly-eye shaped lenses.

8. A card having retroreflective bar codes according to claim 6, wherein the lenses are cat's eye shaped lenses.

9. A card having retroreflective bar codes according to claim 1, wherein the first information recording portion is formed of a retroreflective material portion and a light absorbing mechanical shutter positioned over the retroreflective portion, the shutter having a selectable pattern of lgiht transmissive portions so that a retroreflective code pattern can be selectively formed.

10. A card having retroreflective bar codes according to claim 1, wherein the second information recording portion is in the form of microcomputer which includes a memory in which information is stored.

11. A card having retroreflective bar codes comprising:
    (a) a card substrate;
    (b) a first information recording portion formed of a retroreflective material portion of a predetermined pattern; and
    (c) a second information recording portion comprised of a magnetically readable stripe, the first and second information recording portions being provided on the card substrate.

12. A security identification pass card system comprising:
    a card substrate;
    a first portion formed of a retroreflective material portion of a predetermined pattern on the card substrate, for reflecting a scanning beam of incident light, as modulated in intensity by the predetermined pattern, to a sensor distant by several meters from the pass card, the first portion recording personal identification information of a bearer of the pass card, including the bearer's name, position, and a person number; and
    a second portion formed on the card substrate, the second portion being readable locally with respect to the pass card by direct contact with the second portion, the second portion recording the personal identification information.

13. A security identification pass card according to claim 12, wherein the first portion is formed of bar codes.

14. A security identification pass card according to claim 12, wherein the second portion is in the form of magnetically readable stripes.

15. A security identification pass card according to claim 12, wherein the second portion is in the form of microcomputer which includes a memory in which the personal identification information is stored.

16. A security identification pass card, according to claim 12, characterized in that the first portion comprises recorded tracks of retroreflective material portions and non-retroreflective portions which are formed on a heat distortable, retroreflective material by a selective heating and distortion process in response to information to be recorded.

17. A card having retroreflective bar codes comprising:
    (a) a card substrate;
    (b) a first information recording portion formed of a retroreflective material portion of a predetermined pattern, for reflecting a beam of incident light, as modulated in intensity by the predetermined pattern, to a distance of several meters from the card, wherein the first information recording portion includes recorded tracks of retroreflective material portions and non-retroreflective portions which are formed on a heat distortable, retroreflective material by a selective heating and distortion process in response to information to be recorded; and
    (c) a second information recording portion readable locally with respect to the card, the first and second information recording portions being provided on the card substrate.

18. A card having retroreflective bar codes comprising:
    (a) a card substrate;
    (b) a first information recording portion formed of a retroreflective material portion of a predetermined pattern, for reflecting a beam of incident light, as modulated in intensity by the predetermined pattern, to a distance of several meters from the card and a light absorbing mechanical shutter positioned over the retroreflective portion, the shutter having a selectable pattern of light transmissive portions so that a retroreflective code pattern can be selectively formed; and
    (c) a second information recording portion readable locally with respect to the card, the first and second information recording portions being provided on the card substrate.

19. A card having retroreflective bar codes according to claim 18, wherein the shutter comprises electro-optical means for forming the light transmissive portions in response to an electrical control signal.

20. A security identification pass card system comprising:
    a card substrate;
    a first portion formed of a retroreflective material portion of a predetermined pattern on the card substrate, for reflecting a scanning beam of incident light, as modulated in intensity by the predetermined pattern, to a second distant by several meters from the pass card, the first portion recording person identification information on a bearer of the pass card, including the bearer's name, position, and a personal number, wherein the first portion includes recorded tracks of retroreflective material portions and non-retroreflective portions which are formed on a heat distortable, retroreflective material by a selective heating and distortion process in response to information to be recorded; and
    a second portion formed on the card substrate, the second portion being readable locally with respect to the pass card by direct contact with the second portion, the second portion recording the personal identification information.

* * * * *